(12) United States Patent
Arnold et al.

(10) Patent No.: US 7,161,379 B2
(45) Date of Patent: Jan. 9, 2007

(54) SHUNTED CURRENT REDUCTION

(75) Inventors: Barry J. Arnold, Fort Collins, CO (US); Kevin M. Laake, Fort Collins, CO (US); Andrew R. Allen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 11/089,571

(22) Filed: Apr. 14, 2004

(65) Prior Publication Data

US 2005/0231231 A1    Oct. 20, 2005

(51) Int. Cl.
*H03K 17/16*    (2006.01)
*H03K 19/003*    (2006.01)
*H03K 19/0175*    (2006.01)
*H03K 5/08*    (2006.01)
*H03L 5/00*    (2006.01)

(52) U.S. Cl. .......................... 326/30; 326/21; 326/82; 326/85; 326/86; 326/87; 327/309; 327/310; 327/379; 327/380; 327/331

(58) Field of Classification Search ................... 326/30
See application file for complete search history.

(56) References Cited

U.S. PATENT DOCUMENTS

| | | | |
|---|---|---|---|
| 5,254,883 A | 10/1993 | Horowitz et al. | |
| 5,338,979 A | 8/1994 | Mammano et al. | |
| 5,359,235 A | 10/1994 | Coyle et al. | |
| 5,420,525 A | 5/1995 | Maloberti et al. | |
| 5,528,167 A | 6/1996 | Samela et al. | |
| 5,576,642 A | 11/1996 | Nguyen et al. | |
| 5,686,872 A | 11/1997 | Fried et al. | |
| 5,721,875 A | 2/1998 | Fletcher et al. | |
| 5,819,099 A | 10/1998 | Ovens | |
| 5,959,481 A | 9/1999 | Donnelly et al. | |
| 5,966,042 A | 10/1999 | Werner et al. | |
| 6,121,789 A | 9/2000 | Liu et al. | |
| 6,239,621 B1 | 5/2001 | Milshtein et al. | |
| 6,356,106 B1 | 3/2002 | Greeff et al. | |
| 6,400,179 B1 * | 6/2002 | Armstrong et al. | 326/30 |
| 6,448,837 B1 * | 9/2002 | Naffziger | 327/310 |
| 6,483,348 B1 * | 11/2002 | Naffziger | 326/83 |
| 6,721,150 B1 | 4/2004 | Guerrero et al. | |
| 6,970,011 B1 * | 11/2005 | Arnold | 326/32 |
| 2002/0084826 A1 | 7/2002 | Naffziger | |
| 2003/0147482 A1 | 8/2003 | Pasqualino | |

(Continued)

FOREIGN PATENT DOCUMENTS

EP    0284356 A2    9/1988

(Continued)

OTHER PUBLICATIONS

Gabara, Thaddeus, et al. "Forming Damped LRC Parasitic Circuits in Simultaneously Switched CMOS Output Buffers", IEEE Journal of Solid State Circuits, vol. 32, No. 3, Mar. 1997, pp. 407-418.

(Continued)

*Primary Examiner*—Rexford Barnie
*Assistant Examiner*—Dylan White

(57) ABSTRACT

One disclosed method comprises drawing current from a termination voltage supply and through a termination voltage delivery network by termination circuitry in response to a first signal on one or more lines terminated by the termination circuitry, shunting current from the termination voltage supply and through the termination voltage delivery network in response to a second signal on one or more terminated lines, and helping to reduce the shunted current for extended shunting.

24 Claims, 10 Drawing Sheets

U.S. PATENT DOCUMENTS

2005/0116735 A1 * 6/2005 Arnold ..................... 326/30

FOREIGN PATENT DOCUMENTS

| EP | 0554121 | A2 | 8/1993 |
| EP | 0554121 | A3 | 7/1994 |
| GB | 2373974 | A | 1/2001 |

OTHER PUBLICATIONS

Ilkbahar, Alper, et al. "Itanium Processor System Bus Design", IEEE Journal of Solid State Circuits, vol. 36, No. 10, Oct. 2001, pp. 1565-1573.

* cited by examiner

SHUNTED CURRENT REDUCTION

BACKGROUND ART

One packaged integrated circuit (IC) having on-chip termination circuitry to terminate input/output (I/O) lines draws current from a termination voltage supply depending on the signal on each terminated I/O line. As the signal on a terminated I/O line varies, however, the amount of current drawn through a termination voltage delivery network from the termination voltage supply varies, introducing noise into the supplied termination voltage due to parasitic inductances in, for example, package leads and bond wires of the termination voltage delivery network. Such noise limits the speed or frequency at which signals may be reliably transmitted and/or received on the terminated I/O lines.

A static current shunt may be used for each terminated I/O line to continue drawing the same amount of current from the termination voltage supply regardless of the signal on the terminated I/O line to avoid variations in current drawn through the termination voltage delivery network and therefore to avoid noise in the supplied termination voltage. The static current shunt for each terminated I/O line draws the same amount of current as the termination circuitry for that line and may therefore substantially increase the amount of power consumed by the IC. The increased power consumption by the IC may add to the cost and/or complexity of the IC and/or of the systems using the IC to account for and dissipate the resulting increased heat, may fail to meet power requirements for systems using the IC, and/or may add to the cost to operate the IC.

SUMMARY

One disclosed method comprises drawing current from a termination voltage supply and through a termination voltage delivery network by termination circuitry in response to a first signal on one or more lines terminated by the termination circuitry, shunting current from the termination voltage supply and through the termination voltage delivery network in response to a second signal on one or more terminated lines, and helping to reduce the shunted current for extended shunting.

One disclosed apparatus comprises termination circuitry to terminate one or more lines. The termination circuitry is to draw current from a termination voltage supply and through a termination voltage delivery network. The apparatus also comprises current shunt circuitry to draw current from the termination voltage supply and through the termination voltage delivery network. The current shunt circuitry is to help reduce shunted current for extended shunting.

One disclosed apparatus comprises means for terminating one or more lines, means for shunting current from a termination voltage supply and through a termination voltage delivery network, and means for helping reduce shunted current for extended shunting.

One disclosed system comprises a bus comprising one or more lines, a termination voltage supply, and a plurality of devices coupled to the bus. At least one device is a terminating device comprising a termination voltage delivery network and termination circuitry coupled to the termination voltage supply to terminate one or more lines of the bus. The terminating device has termination voltage current shunting with shunted current reduction for extended shunting.

BRIEF DESCRIPTION OF DRAWINGS

One or more embodiments of the present invention are illustrated by way of example and not limitation in the figures of the accompanying drawings, in which like references indicate similar elements and in which.

DETAILED DESCRIPTION

Figure 1:
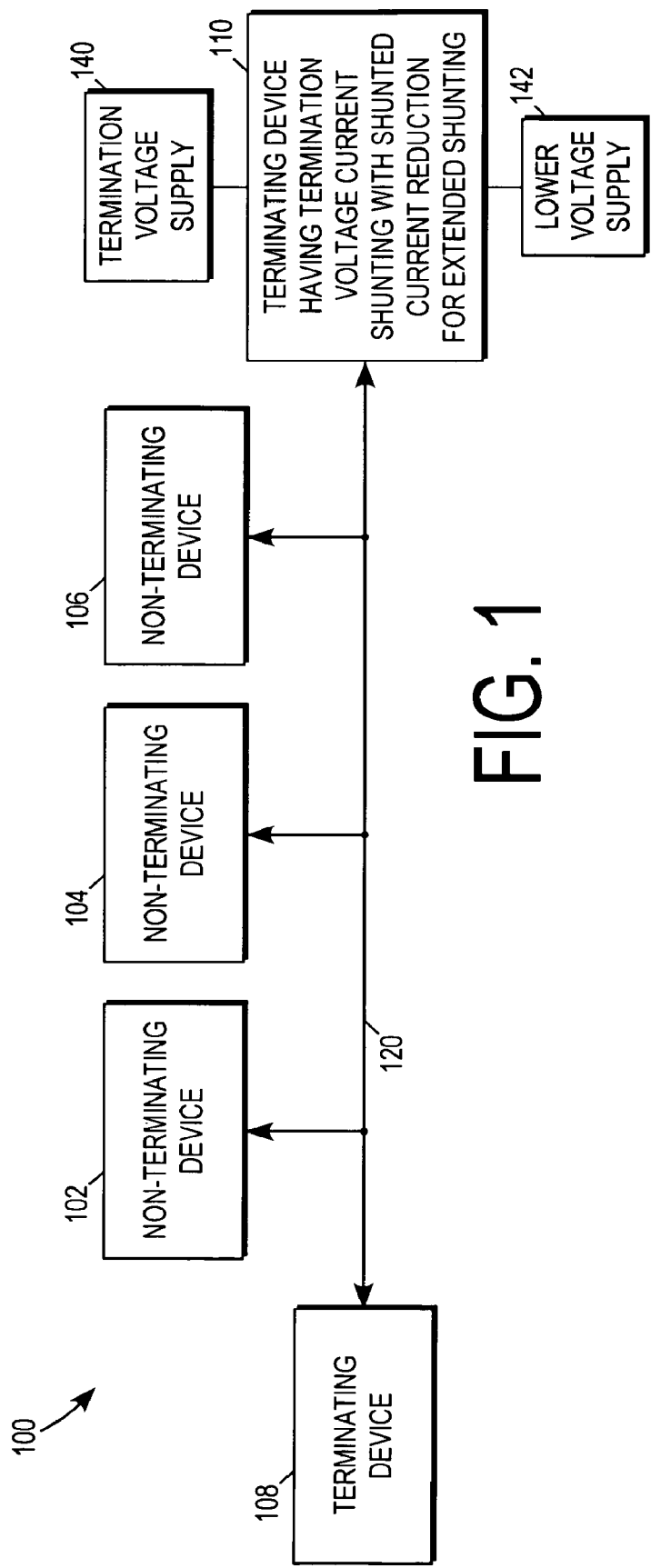
FIG. 1 illustrates, for one or more embodiments, an example system comprising a terminating device having termination voltage current shunting with shunted current reduction for extended shunting.

FIG. 1 illustrates, for one or more embodiments, an example system 100 comprising a plurality of devices 102, 104, 106, 108, and 110 coupled to a bus 120.

Devices 102, 104, 106, 108, and/or 110 for one embodiment may each comprise any circuitry suitable to perform any one or more functions. Devices 102, 104, 106, 108, and/or 110 for one embodiment may each comprise one or more integrated circuits in a package and may or may not be mounted on the same circuit board with any other device 102, 104, 106, 108, and/or 110. Bus 120 may comprise any suitable number of one or more lines at each device 102, 104, 106, 108, and 110 and may be implemented using any suitable communications medium or media. Devices 102–110 and bus 120 for one embodiment, as illustrated in FIG. 1, may be configured in a double-terminated multi drop or multipoint bus configuration to allow devices 102, 104, 106, 108, and/or 110 to communicate with one another over bus 120.

Devices 102, 104, and 106 are non-terminating devices. Devices 102–106 may comprise any suitable circuitry to transmit signals onto one or more lines of bus 120 and/or to receive signals from one or more lines of bus 120 in any suitable manner. Although illustrated as having three non-terminating devices, system 100 for another embodiment may have zero or any suitable number of one or more non-terminating devices.

Devices 108 and 110 are terminating devices. Devices 108 and 110 for one embodiment may comprise any suitable circuitry to transmit signals onto one or more lines of bus 120 and/or to receive signals from one or more lines of bus 120 in any suitable manner.

Device 108 may comprise any suitable termination circuitry to terminate one or more lines of bus 120. Device 108 for one embodiment may comprise only termination circuitry.

Device 110 may comprise any suitable circuitry to terminate one or more lines of bus 120. Device 110 is coupled to a termination voltage supply 140 and uses termination voltage supply 140 in terminating one or more lines of bus 120. Termination voltage supply 140 may supply power at any suitable voltage level, such as at approximately 1.2 volts (V) for example. Device 110 also comprises circuitry to perform termination voltage current shunting for one or more lines of bus 120 to shunt current from termination voltage supply 140 to a suitable lower voltage supply 142, such as ground for example, coupled to device 110 and to help reduce shunted current for extended shunting. In this manner, device 110 may help stabilize the supply of power from termination voltage supply 140 at a tolerable noise level and also help reduce its power consumption.

Although illustrated in a double-terminated multidrop or multipoint bus configuration, device 110 may be configured with any suitable number of one or more other terminating and/or non-terminating devices in any suitable bus configuration.

Figure 2:
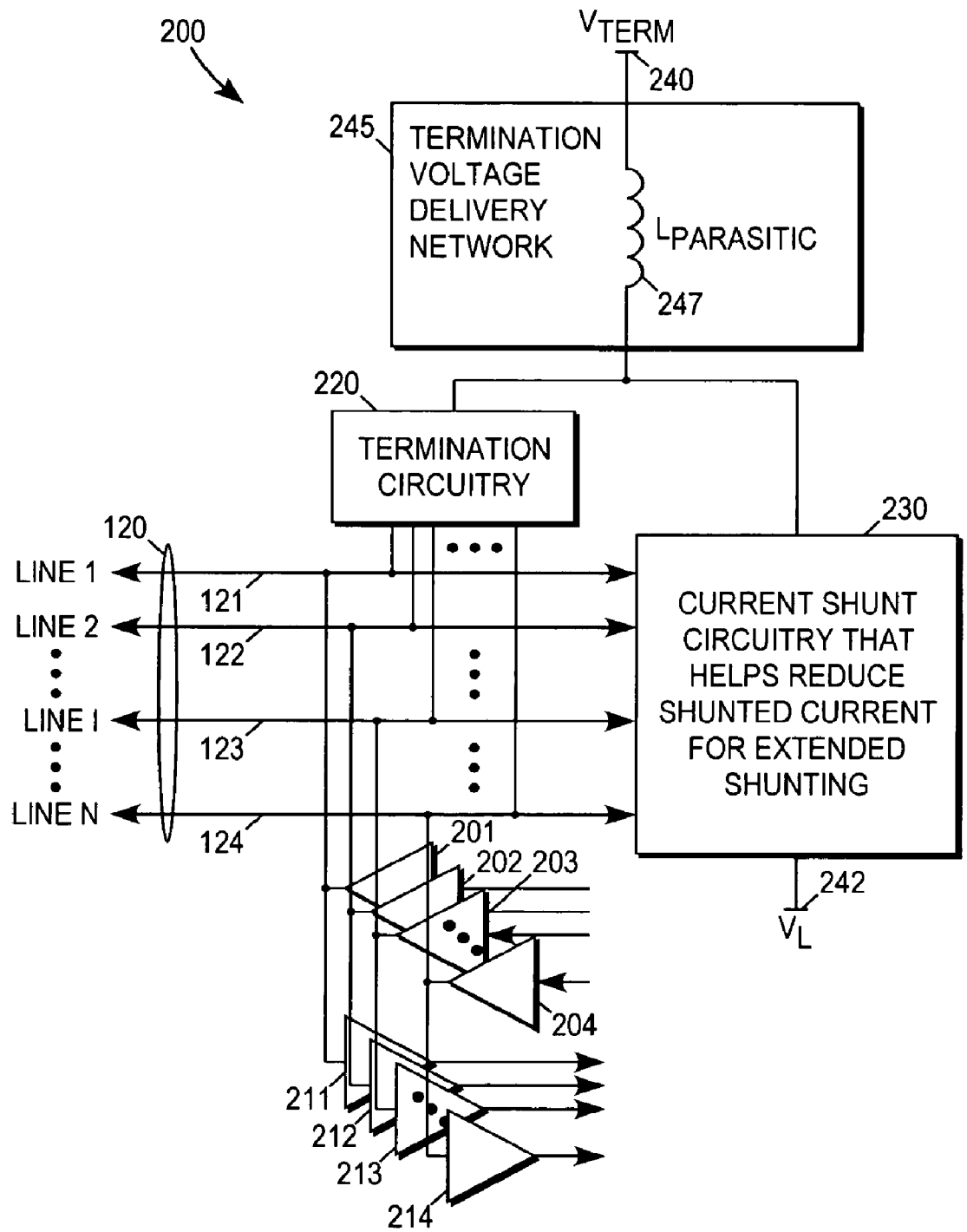
FIG. 2 illustrates, for one or more embodiments, a block diagram of circuitry for a device having termination voltage current shunting with shunted current reduction for extended shunting.

As illustrated in FIG. 2, device 110 for one embodiment may comprise circuitry 200. Circuitry 200 for one embodiment comprises transmitters 201, 202, 203, and 204, receivers 211, 212, 213, and 214, termination circuitry 220, current shunt circuitry 230 that helps reduce shunted current for extended shunting, and a termination voltage delivery network 245.

Transmitters 201, 202, 203, and 204 are coupled to transmit signals from device 110 onto input/output (I/O) lines 121, 122, 123, and 124 of bus 120, respectively. Transmitters 201, 202, 203, and 204 may comprise any suitable circuitry to transmit any suitable signals onto lines 121, 122, 123, and 124, respectively. Although described in connection with four transmitters to transmit signals onto four lines of bus 120, circuitry 200 may comprise any suitable number of one or more transmitters to transmit signals onto any suitable number of one or more lines of bus 120. Circuitry 200 for another embodiment may not comprise any transmitters.

Receivers 211, 212, 213, and 214 are coupled to receive signals from lines 121, 122, 123, and 124, respectively, for device 110. Receivers 211, 212, 213, and 214 may comprise any suitable circuitry to receive any suitable signals from lines 121, 122, 123, and 124, respectively. Although described in connection with four receivers to receive signals from four lines of bus 120, circuitry 200 may comprise any suitable number of one or more receivers to receive signals from any suitable number of one or more lines of bus 120. Circuitry 200 for another embodiment may not comprise any receivers.

Termination circuitry 220 terminates lines 121, 122, 123, and 124 of bus 120. Termination circuitry 220 is coupled to lines 121, 122, 123, and 124 and to one or more termination voltage supply terminals collectively represented by a $V_{TERM}$ terminal 240 through termination voltage delivery network 245 for coupling to termination voltage supply 140. Termination circuitry 220 may comprise any suitable circuitry to terminate lines 121, 122, 123, and 124. Although described in connection with terminating four lines of bus 120, termination circuitry 220 may be used to terminate any suitable number of one or more lines of bus 120.

Transmitters 201, 202, 203, and 204 for one embodiment may each comprise a pull-down transistor coupled between line 121, 122, 123, and 124, respectively, and a voltage supply terminal for coupling to any suitable lower voltage supply. Transmitters 201, 202, 203, and 204 for one embodiment may then be used to transmit a first signal at a voltage level less than, or alternatively less than or equal to, a suitable threshold onto line 121, 122, 123, and 124, respectively, by activating the pull-down transistor. Transmitters 201, 202, 203, and 204 for one embodiment may then also be used to transmit a second signal at a voltage level greater than, or alternatively greater than or equal to, a suitable threshold onto line 121, 122, 123, and 124, respectively, by deactivating the pull-down transistor to allow termination circuitry 220 to pull line 121, 122, 123, and 124, respectively, to a higher voltage. Transmitters 201, 202, 203, and 204 for one embodiment may each comprise a supplemental pull-up transistor coupled between line 121, 122, 123, and 124, respectively, and a voltage supply terminal for coupling to any suitable voltage supply. Transmitters 201, 202, 203, and 204 for one embodiment may then be used to help pull lines 121, 122, 123, and 124, respectively, to a higher voltage by activating the pull-up transistor while deactivating the pull-down transistor. The first and second signals for one embodiment may correspond to logical one and logical zero bits, respectively. For another embodiment, the first and second signals may correspond to logical zero and logical one bits, respectively.

Receivers 211, 212, 213, and 214 for one embodiment may compare the voltage level of a signal on lines 121, 122, 123, and 124, respectively, to any suitable one or more thresholds to identify whether the signal is at a voltage level greater than, or alternatively greater than or equal to, a threshold and/or whether the signal is at a voltage level less than, or alternatively less than or equal to, a threshold. Receivers 211, 212, 213, and 214 for one embodiment may then generate and output any suitable signal identifying the signal received on lines 121, 122, 123, and 124, respectively. Receivers 211, 212, 213, and 214 may be coupled to any suitable one or more voltage supply terminals for coupling to any suitable one or more voltage supplies to receive signals on lines 121, 122, 123, and 124, respectively.

Termination voltage delivery network 245 delivers power from termination voltage supply 140 to termination circuitry 220 and to current shunt circuitry 230. For one embodiment where device 110 comprises one or more integrated circuits in a package, termination voltage delivery network 245 for one embodiment may comprise any suitable one or more conductive structures to deliver power from termination voltage supply 140 to one or more integrated circuits through the package. Suitable conductive structures may include, for example, one or more leads, one or more bonding wires, one or more conductive bumps, one or more conductive balls, one or more conductive planes, and/or one or more vias filled with conductive material between conductive planes. Because conductive structures have parasitic inductances in series with current flow as represented in FIG. 2 with an inductor 247 having an inductance of $L_{PARASITIC}$, variation in current (i.e., dI/dt) flowing through termination voltage delivery network 245 introduces noise into the delivered termination voltage. The more the current varies and the faster and more often the current varies, the more noise may be introduced into the delivered termination voltage and therefore limit the speed or frequency at which signals may be reliably transmitted and/or received on lines 121, 122, 123, and 124.

Current shunt circuitry 230 shunts current for one or more of terminated lines 121, 122, 123, and 124 to help reduce current variation through termination voltage delivery network 245 and therefore to help limit noise in the delivered termination voltage. Current shunt circuitry 230 is coupled to $V_{TERM}$ terminal 240 through termination voltage delivery network 245 for coupling to termination voltage supply 140, to one or more lower voltage supply terminals collectively represented by a $V_L$ terminal 242 for coupling to lower voltage supply 142, and to one or more of lines 121, 122, 123, and 124. Current shunt circuitry 230 may comprise any suitable circuitry to shunt current for one or more of terminated lines 121, 122, 123, and 124. Although described in connection with shunting current for one or more of four lines of bus 120, current shunt circuitry 230 may be used to shunt current for any suitable number of one or more terminated lines of bus 120.

Current shunt circuitry 230 helps reduce the amount of shunted current for extended current shunting to help reduce power consumption. Current shunt circuitry 230 for one embodiment may help gradually reduce the amount of shunted current for extended current shunting to help minimize or reduce the amount of noise introduced into the delivered termination voltage due to the resulting current variation through termination voltage delivery network 245. Current shunt circuitry 230 for one embodiment may help reduce the amount of shunted current for extended current shunting performed when lines 121, 122, 123, and/or 124 are idle.

Figure 3:
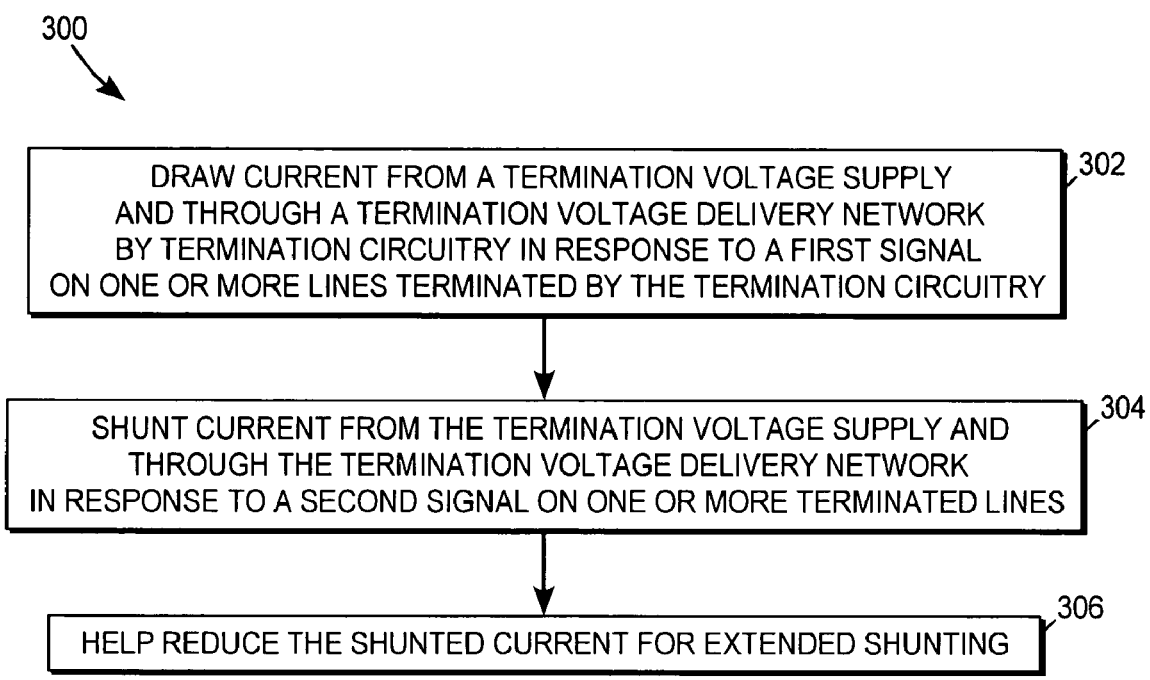
FIG. 3 illustrates, for one or more embodiments, a flow diagram to perform termination voltage current shunting with shunted current reduction for extended shunting.

Circuitry 200 for one embodiment may perform termination voltage current shunting with shunted current reduction for extended shunting in accordance with a flow diagram 300 of FIG. 3.

For block 302 of FIG. 3, termination circuitry 220 draws current from termination voltage supply 140 and through termination voltage delivery network 245 in response to a first signal on one or more of terminated lines 121, 122, 123, and 124. Termination circuitry 220 may draw any suitable amount of current from termination voltage supply 140 in response to any suitable signal on a line. Termination circuitry 220 for one embodiment may draw current from termination voltage supply 140 in response to a signal at a voltage level less than, or alternatively less than or equal to, a predetermined threshold on a line.

For block 304, current shunt circuitry 230 shunts current from termination voltage supply 140 and through termination voltage delivery network 245 in response to a second signal on one or more of terminated lines 121, 122, 123, and 124. Current shunt circuitry 230 may draw any suitable amount of current from termination voltage supply 140 in response to any suitable signal on a line. Current shunt circuitry 230 for one embodiment may draw current from termination voltage supply 140 in response to a signal at a voltage level greater than, or alternatively greater than or equal to, a predetermined threshold on a line.

For block 306, current shunt circuitry 230 helps reduce the shunted current for extended shunting. Current shunt circuitry 230 may help reduce shunted current in any suitable manner for any suitable extended shunting.

Current shunt circuitry 230 for one embodiment may help reduce the shunted current based on whether one or more conditions based on a presence of the second signal on one or more of terminated lines 121, 122, 123, and 124 have been satisfied. Current shunt circuitry 230 may help reduce the shunted current in response to the satisfaction of any suitable one or more conditions based on a presence of the second signal on one or more of terminated lines 121, 122, 123, and 124.

Current shunt circuitry 230 for one embodiment may help reduce the shunted current based on an extended presence of the second signal on one or more of terminated lines 121, 122, 123, and 124. Current shunt circuitry 230 for one embodiment may help reduce the shunted current based on an extended presence of the second signal on any one or more of terminated lines 121, 122, 123, and 124. Current shunt circuitry 230 for one embodiment may help reduce the shunted current based on an extended presence of the second signal on one or more lines of a set of one or more predetermined sets of one or more of terminated lines 121, 122, 123, and 124. Current shunt circuitry 230 for one embodiment may help reduce the shunted current based on an extended presence of the second signal on all line(s) of a set of one or more predetermined sets of one or more lines of terminated lines 121, 122, 123, and 124. Current shunt circuitry 230 for one embodiment may help reduce the shunted current based on an extended presence of the second signal on all of terminated lines 121, 122, 123, and 124. For one embodiment, the extended presence of the second signal on a line may possibly correspond to an idle condition of that line.

Current shunt circuitry 230 may help reduce the amount of shunted current for block 306 in any suitable manner. Current shunt circuitry 230 for one embodiment may help gradually reduce the amount of shunted current in any suitable manner for block 306 to help minimize or reduce the amount of noise introduced into the delivered termination voltage due to the resulting current variation through termination voltage delivery network 245.

Circuitry 200 may perform operations for blocks 302–306 in any suitable order and may or may not overlap in time the performance of any suitable operation with any other suitable operation.

Device 110 for one embodiment may comprise a plurality of termination voltage delivery networks 245 through which current may be drawn for a respective set of one or more input/output (I/O) lines. Device 110 for one embodiment may therefore comprise separate termination circuitry 220 and separate current shunt circuitry 230 for each of one or more termination voltage delivery networks 245 of device 110 to help reduce current variation through a respective termination voltage delivery network 245 and to help reduce the amount of shunted current for extended current shunting to help reduce power consumption.

Device 108 of FIG. 1 for one embodiment may also have current shunt circuitry that helps reduce shunted current for extended shunting for one or more lines of bus 120.

Current Shunt Circuitry

Current shunt circuitry 230 for one embodiment may selectively enable and disable current shunting for one or more terminated lines for which current is drawn through termination voltage delivery network 245 to help reduce current variation through termination voltage delivery network 245 and to help reduce the amount of shunted current for extended current shunting to help reduce power consumption.

Figure 4:
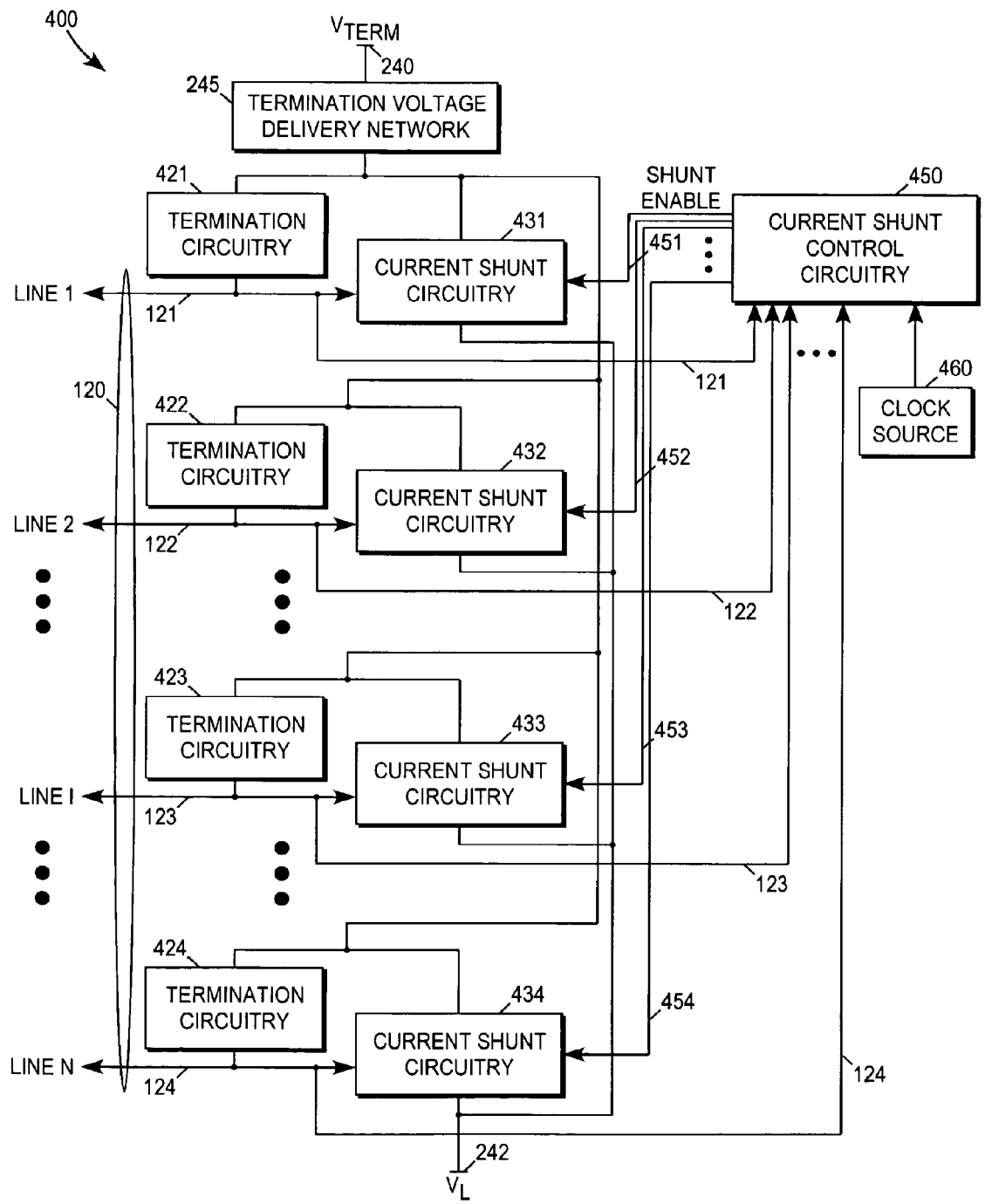
FIG. 4 illustrates, for one or more embodiments, a block diagram of circuitry to implement termination voltage current shunting with shunted current reduction for extended shunting.

FIG. 4 illustrates, for one or more embodiments, a block diagram of circuitry 400 comprising termination circuitry 421, 422, 423, and 424 for terminated lines 121, 122, 123, and 124, respectively, to implement one or more embodiments of termination circuitry 220 of FIG. 2 and comprising current shunt control circuitry 450 to enable or disable current shunt circuitry 431, 432, 433, and 434 for terminated lines 121, 122, 123, and 124, respectively, to implement one or more embodiments of current shunt circuitry 230 of FIG. 2.

Termination circuitry 421 is coupled between line 121 and $V_{TERM}$ terminal 240 for coupling to termination voltage supply 140 (FIG. 1). Termination circuitry 422 is coupled between line 122 and $V_{TERM}$ terminal 240. Termination circuitry 423 is coupled between line 123 and $V_{TERM}$ terminal 240. Termination circuitry 424 is coupled between line 124 and $V_{TERM}$ terminal 240. Termination circuitry 421, 422, 423, and 424 for one embodiment may draw current from termination voltage supply 140 in response to a first signal on lines 121, 122, 123, and 124, respectively. Termination circuitry 421, 422, 423, and 424 may comprise any suitable circuitry to terminate lines 121, 122, 123, and 124, respectively.

Figure 5:
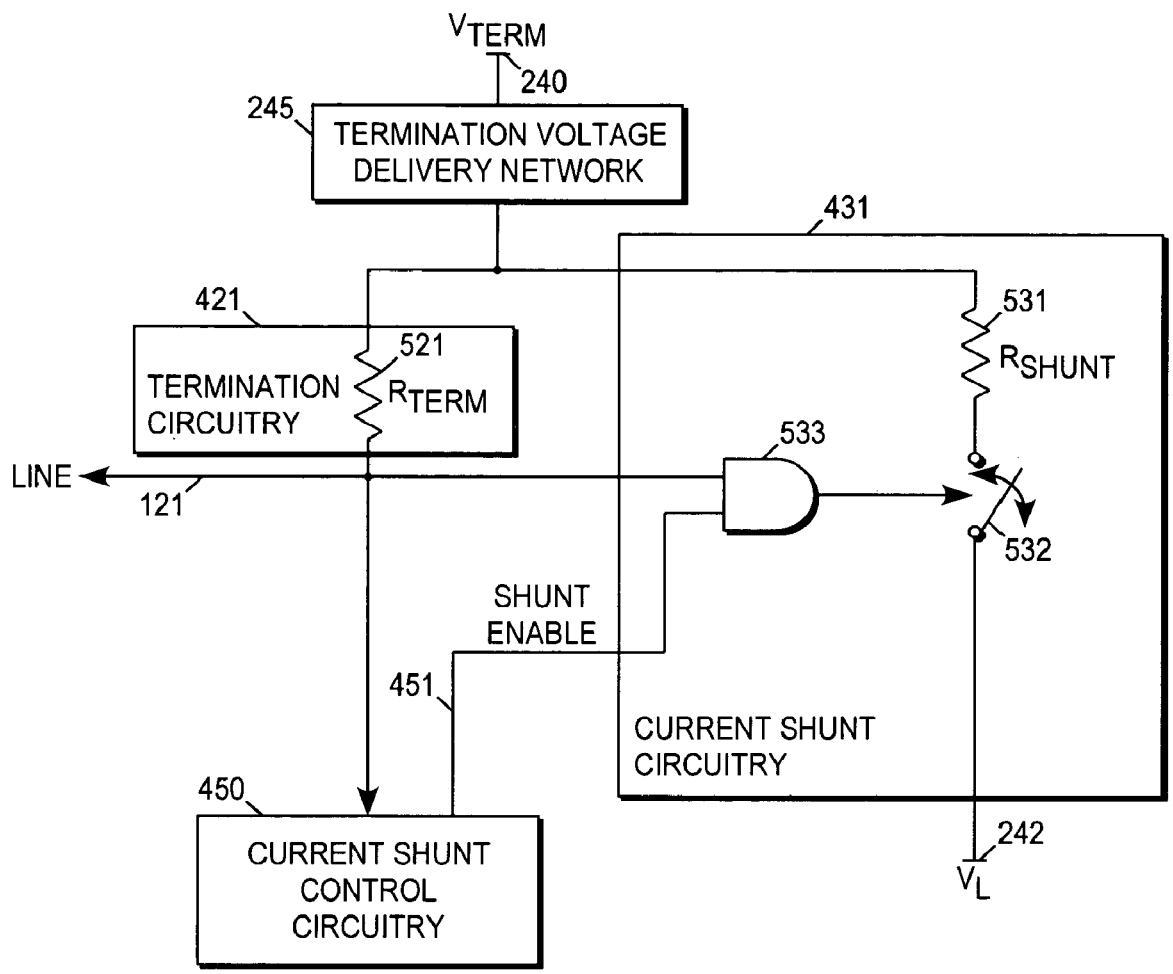
FIG. 5 illustrates, for one or more embodiments, a functional diagram of termination circuitry and current shunt circuitry for a line.

For one embodiment, as illustrated in FIG. 5, termination circuitry 421 may comprise circuitry to function as a resistor 521 having a resistance $R_{TERM}$ coupled between $V_{TERM}$ terminal 240 and line 121 and may draw current from $V_{TERM}$ terminal 240 based on the voltage across resistor 521. For one embodiment where termination circuitry 421 is connected directly to line 121 and to termination voltage delivery network 245 having a voltage difference $V_{NET}$ between $V_{TERM}$ terminal 240 and resistor 521, termination circuitry 421 draws current approximately equal to $(V_{TERM}-V_{NET}-V_{OL})/R_{TERM}$ when a first signal at approximately a lower voltage $V_{OL}$, for example, appears on line 121 and draws minimal, if any, current when a second signal at approximately a higher voltage $V_{OH}$ near or approximately equal to $V_{TERM}$ appears on line 121.

Resistor 521 may have any suitable resistance $R_{TERM}$ to help terminate line 121. Termination circuitry 421 for one embodiment may comprise circuitry to implement resistor 521 of a suitable resistance $R_{TERM}$ such that the impedance connected to line 121 at device 110 approximates the characteristic impedance of line 121. As one example, resistor 521 for one embodiment may be implemented with a resistance $R_{TERM}$ in the range of approximately 45 ohms to approximately 50 ohms.

Resistor 521 for one embodiment may be implemented using an activated p-channel metal oxide semiconductor field effect transistor (p-MOSFET) of a suitable size. Resistor 521 for one embodiment may be implemented using a plurality of p-MOSFETs of a suitable size coupled in parallel between $V_{TERM}$ terminal 240 and line 121. The resistance $R_{TERM}$ for one embodiment may then be set and/or controlled in the presence of process, voltage, and/or temperature (PVT) variations by selectively activating one or more of the plurality of p-MOSFETs.

Although described in connection with using one or more p-MOSFETs, termination circuitry 421 for another embodiment may be implemented using any suitable transistor(s) including any suitable field effect transistor(s) (FET(s)) for example.

Termination circuitry 422, 423, and/or 424 for one embodiment may similarly function as termination circuitry 421.

Current shunt circuitry 431, 432, 433, and 434 are each coupled between $V_{TERM}$ terminal 240 for coupling to termination voltage supply 140 (FIG. 1) and $V_L$ terminal 242 for coupling to lower voltage supply 142 (FIG. 1). Current shunt circuitry 431, 432, 433, and 434 for one embodiment, as illustrated in FIG. 4, may be coupled to lines 121, 122, 123, and 124, respectively, to shunt current from $V_{TERM}$ terminal 240 to $V_L$ terminal 242, when enabled, in response to a second signal on lines 121, 122, 123, and 124, respectively. Current shunt circuitry 431, 432, 433, and 434 may comprise any suitable circuitry to shunt any suitable amount of current, when enabled, for terminated lines 121, 122, 123, and 124, respectively.

For one embodiment, as illustrated in FIG. 5, current shunt circuitry 431 may comprise circuitry to function as a resistor 531 having a resistance $R_{SHUNT}$ coupled between $V_{TERM}$ terminal 240 and $V_L$ terminal 242 and may draw current from $V_{TERM}$ terminal 240 based on the voltage across resistor 531. Current shunt circuitry 431 for one embodiment may comprise circuitry to function as a switch 532 in series with resistor 531 to couple resistor 531 between $V_{TERM}$ terminal 240 and $V_L$ terminal 242 in a selective manner based on the signal on line 121. Switch 532 for one embodiment may be coupled to line 121 and activated in response to a second signal on line 121 to allow resistor 531 to be coupled between $V_{TERM}$ terminal 240 and $V_L$ terminal 242. Switch 532 for one embodiment may then be deactivated in response to a first signal on line 121 to help prevent resistor 531 from being coupled between $V_{TERM}$ terminal 240 and $V_L$ terminal 242. For one embodiment where current shunt circuitry 431 is connected directly to $V_L$ terminal 242 and to termination voltage delivery network 245 having a voltage difference $V_{NET}$ between $V_{TERM}$ terminal 240 and resistor 531, current shunt circuitry 431 draws current approximately equal to $(V_{TERM}-V_{NET}-V_L)/R_{SHUNT}$ in response to the second signal on line 121.

Resistor 531 may have any suitable resistance $R_{SHUNT}$ to draw any suitable amount of current through termination voltage delivery network 245. Resistor 531 for one embodiment may have a resistance $R_{SHUNT}$ to draw approximately the same amount of current as that drawn by termination circuitry 421 through termination voltage delivery network 245. Resistor 531 for one embodiment may have a resistance $R_{SHUNT}$ to draw more or less current than that drawn by termination circuitry 421.

Resistor 531 for one embodiment may be implemented using an activated n-channel metal oxide semiconductor field effect transistor (n-MOSFET) of a suitable size. Switch 532 for one embodiment may be implemented using an n-MOSFET of a suitable size with its gate coupled to receive the signal on line 121. Resistor 531 and switch 532 for one embodiment may both be implemented using a single n-MOSFET of a suitable size with its gate coupled to receive the signal on line 121.

Resistor 531 for one embodiment may be implemented using a plurality of n-MOSFETs of a suitable size coupled in parallel between $V_{TERM}$ terminal 240 and $V_L$ terminal 242. The resistance $R_{SHUNT}$ for one embodiment may then be set and/or controlled in the presence of process, voltage, and/or temperature (PVT) variations by selectively activating one or more of the plurality of n-MOSFETs. Switch 532 for one embodiment may be implemented using a plurality of n-MOSFETs of a suitable size coupled in parallel between $V_{TERM}$ terminal 240 and $V_L$ terminal 242 with each n-MOSFET coupled in series with a respective n-MOSFET for resistor 531 and with the gate of each n-MOSFET for switch 532 coupled to receive the signal on line 121.

Although described in connection with using one or more n-MOSFETs, current shunt circuitry 431 for another embodiment may be implemented using any suitable transistor(s) including any suitable field effect transistor(s) (FET(s)) for example.

Current shunt circuitry 431 may comprise any suitable circuitry to allow current shunt circuitry 431 to be enabled and disabled by current shunt control circuitry 450.

Current shunt circuitry 431 for one embodiment may comprise any suitable circuitry to help control switch 532 in a selective manner to allow switch 532 to be activated and deactivated based on the signal on line 121 or to deactivate switch 532 regardless of the signal on line 121. Current shunt circuitry 431 for one embodiment, as illustrated in FIG. 5, may comprise any suitable circuitry to implement an AND gate 533 having one input coupled to line 121, having another input coupled to a shunt enable line 451 coupled to current shunt control circuitry 450, and having an output coupled to activate and deactivate switch 532. Switch 532 for one embodiment may then be activated and deactivated based on the signal on line 121 when current shunt control circuitry 450 generates and outputs an enable signal on shunt enable line 451 and may be deactivated regardless of the signal on line 121 when current shunt control circuitry 450 generates and outputs a disable signal on shunt enable line 451.

Current shunt circuitry 431 for one embodiment may comprise any suitable circuitry to allow switch 532 and resistor 531 to be coupled between $V_{TERM}$ terminal 240 and $V_L$ terminal 242 in a selective manner. Current shunt circuitry 431 for one embodiment may comprise circuitry to implement a switch coupled in series with switch 532 and resistor 531 and coupled to shunt enable line 451 to couple switch 532 and resistor 531 between $V_{TERM}$ terminal 240 and $V_L$ terminal 242 in response to an enable signal on shunt enable line 451.

Current shunt circuitry 432, 433, and/or 434 for one embodiment may similarly function as current shunt circuitry 431. Current shunt circuitry 432, 433, and 434 may draw approximately the same current as, less current than, or more current than that drawn by termination circuitry 422, 423, and 424, respectively, through termination voltage delivery network 245. Current shunt circuitry 431, 432, 433, and/or 434 may or may not draw the same amount of current through termination voltage delivery network 245.

Although illustrated in FIG. 4 as having current shunt circuitry for all terminated lines for which current is drawn through termination voltage delivery network 245, current shunt circuitry 230 of FIG. 2 for one embodiment may not comprise current shunt circuitry for one or more terminated lines for which current is drawn through termination voltage delivery network 245.

Current Shunt Control Circuitry

Current shunt control circuitry 450 is coupled to enable or disable current shunt circuitry 431, 432, 433, and 434 in a selective manner to help reduce current variation through termination voltage delivery network 245 and to help reduce the amount of shunted current for extended current shunting to help reduce power consumption. Current shunt control circuitry 450 for one embodiment may be coupled to generate and output an enable or disable signal on one or more shunt enable lines to enable or disable current shunt circuitry 431, 432, 433, and 434. Current shunt control circuitry 450 for one embodiment, as illustrated in FIG. 4, may be coupled to current shunt circuitry 431, 432, 433, and 434 by a respective shunt enable line 451, 452, 453, and 454. Current shunt control circuitry 450 for another embodiment may be coupled to more than one of current shunt circuitry 431, 432, 433, and 434 by a single shunt enable line.

Current shunt control circuitry 450 may comprise any suitable circuitry to enable or disable current shunt circuitry 431, 432, 433, and 434 selectively in any suitable manner to help reduce the amount of shunted current for extended current shunting to help reduce power consumption. Current shunt control circuitry 450 for one embodiment may selectively enable or disable current shunt circuitry 431, 432, 433, and 434 in accordance with a flow diagram 600 of FIG. 6.

Figure 6:
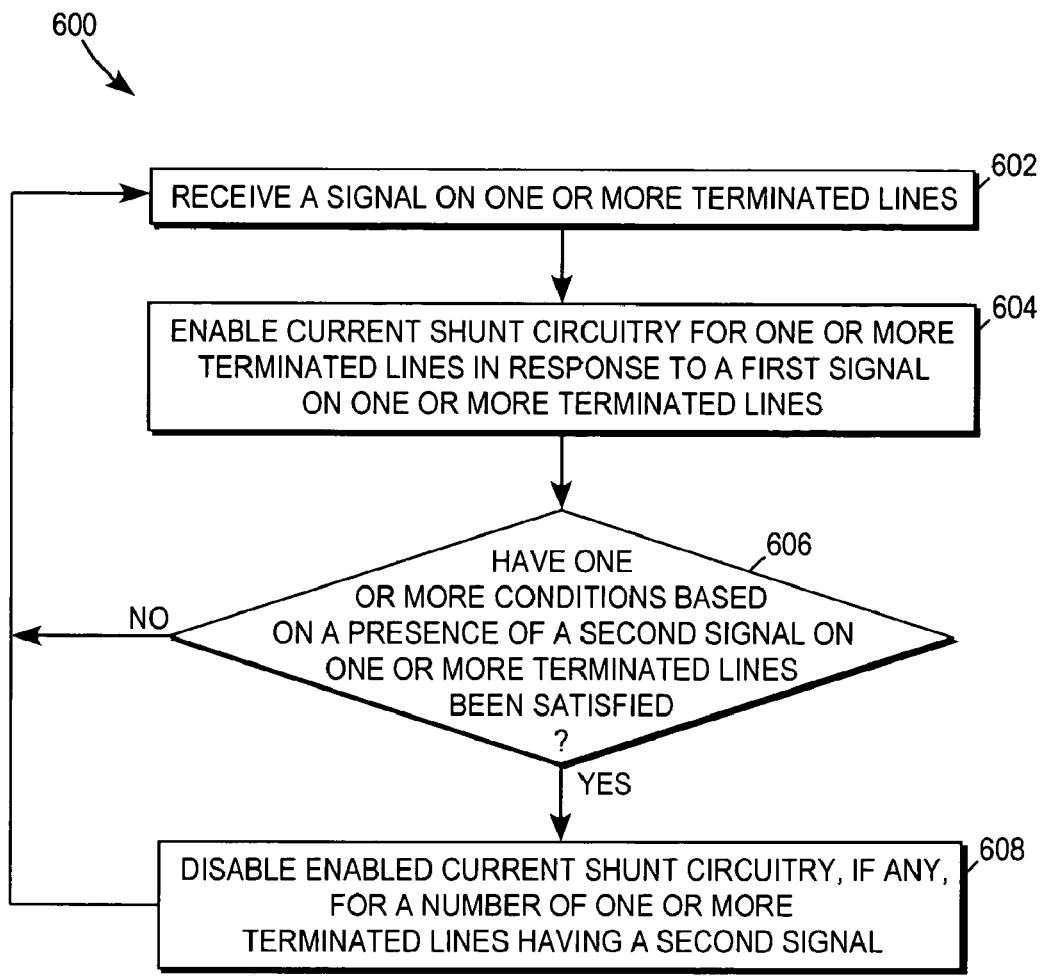
FIG. 6 illustrates, for one or more embodiments, a flow diagram to help reduce shunted current for extended termination voltage current shunting using the circuitry of FIG. 4.

For block 602 of FIG. 6, current shunt control circuitry 450 receives a signal on one or more of terminated lines 121, 122, 123, and 124. As illustrated in FIG. 4, current shunt control circuitry 450 for one embodiment may be coupled to receive a signal on terminated lines 121, 122, 123, and 124.

For block 604, current shunt control circuitry 450 enables one or more of current shunt circuitry 431, 432, 433, and 434 in response to a first signal on one or more of terminated lines 121, 122, 123, and 124. Current shunt control circuitry 450 for one embodiment may enable the current shunt circuitry 431, 432, 433, and/or 434 for the respective terminated line 121, 122, 123, and/or 124 having a first signal. Current shunt control circuitry 450 for one embodiment may enable all of current shunt circuitry 431, 432, 433, and 434 in response to a first signal on one or more of terminated lines 121, 122, 123, and 124. Current shunt control circuitry 450 for one embodiment may enable current shunt circuitry 431, 432, 433, and/or 434 based on the number of current shunt circuitry 431, 432, 433, and 434 that are already enabled. Current shunt control circuitry 450 for one embodiment may enable current shunt circuitry 431, 432, 433, and/or 434 based on which of current shunt circuitry 431, 432, 433, and 434 are already enabled. A first signal for one embodiment may have a voltage level less than, or alternatively less than or equal to, a predetermined threshold. For one embodiment, the presence of the first signal on a line may correspond to an active or busy condition of that line.

If one or more conditions based on a presence of a second signal on one or more of terminated lines 121, 122, 123, and 124 have been satisfied for block 606, current shunt control circuitry 450 for block 608 disables enabled current shunt circuitry 431, 432, 433, and/or 434, if any, for a number of one or more of terminated lines 121, 122, 123, and 124 having a second signal. Current shunt control circuitry 450 may disable enabled current shunt circuitry 431, 432, 433, and/or 434, if any, for any suitable number of one or more of terminated lines 121, 122, 123, and 124 having a second signal in response to the satisfaction of any suitable one or more conditions based on a presence of the second signal on one or more of terminated lines 121, 122, 123, and 124. A second signal for one embodiment may have a voltage level greater than, or alternatively greater than or equal to, a predetermined threshold.

Current shunt control circuitry 450 for one embodiment may disable enabled current shunt circuitry 431, 432, 433, and/or 434, if any, for any suitable number of one or more of terminated lines 121, 122, 123, and 124 having a second signal in response to the satisfaction of any suitable one or more conditions based on an extended presence of the second signal on one or more of terminated lines 121, 122, 123, and 124. For one embodiment, an extended presence of the second signal on a line may possibly correspond to an idle condition of that line.

Current shunt control circuitry 450 for one embodiment, as illustrated in FIG. 4, may be coupled to receive a clock signal from a clock source 460 to help identify an extended presence of the second signal on one or more of terminated lines 121, 122, 123, and 124. Clock source 460 may comprise any suitable circuitry to generate and output any suitable clock signal having any suitable frequency and any suitable duty cycle. Clock source 460 may be a part of device 110 or may be external to device 110. Clock source 460 for one embodiment may receive a clock signal from another clock source that may be a part of device 110 or that may be external to device 110 to generate a clock signal for current shunt control circuitry 450. Current shunt control circuitry 450 for one embodiment may identify that a terminated line has an extended presence of the second signal if the second signal is present on the terminated line for more than any suitable predetermined number of one or more data cycles defined by the clock signal generated and output from clock source 460. Current shunt control circuitry 450 for one embodiment may identify that a terminated line has an extended presence of the second signal if the second signal is present on the terminated line for more than one data cycle.

If one or more conditions based on a presence of the second signal on one or more of terminated lines 121, 122, 123, and 124 have not been satisfied for block 606, current shunt control circuitry 450 does not perform operations for block 608.

Current shunt control circuitry 450 repeats operations for blocks 602, 604, 606, and/or 608 to help reduce current variation through termination voltage delivery network 245 by enabling current shunt circuitry 431, 432, 433, and/or 434 for block 604 and to help reduce the amount of shunted current for extended current shunting by disabling current shunt circuitry 431, 432, 433, and/or 434 for block 608 when one or more conditions based on a presence of a second signal on one or more of terminated lines 121, 122, 123, and 124 have been satisfied for block 606. The one or more conditions based on a presence of a second signal on one or more of terminated lines 121, 122, 123, and 124 for a given iteration of block 606 may be the same as or different than the one or more conditions for another iteration of block 606. For one embodiment, one iteration of blocks 602, 604, 606, and/or 608 may correspond to one data cycle.

Current shunt control circuitry 450 for one embodiment for block 608 may disable enabled current shunt circuitry 431, 432, 433, and/or 434, if any, for at most any suitable predetermined number of any suitable one or more of terminated lines 121, 122, 123, and 124, respectively, having a second signal. Current shunt control circuitry 450 for one embodiment may then help control the rate at which current shunt control circuitry 450 helps reduce the amount of shunted current as current shunt control circuitry 450 repeats operations for multiple iterations of block 608. As one example, current shunt control circuitry 450 for one embodiment may, for each of multiple iterations of block 608, disable enabled current shunt circuitry 431, 432, 433, and/or 434 for at most a predetermined number of terminated lines 121, 122, 123, and/or 124, respectively, less than, or alternatively less than or equal to, the total number of terminated lines 121, 122, 123, and 124 for which current may be shunted through termination voltage delivery network 245 to help gradually reduce the amount of shunted current for extended current shunting. As another example, current shunt control circuitry 450 for one embodiment may disable enabled current shunt circuitry 431, 432, 433, or 434 for at most one terminated line 121, 122, 123, or 124, respectively, for each of multiple iterations of block 608 to help gradually reduce the amount of shunted current for extended current shunting. The predetermined number of terminated line(s) for a given iteration of block 608 may or may not be the same as that for another iteration of block 608.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal in response to one or more of terminated lines 121, 122, 123, and 124 having the second signal for block 606.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal in response to one or more of terminated lines 121, 122, 123, and 124 having an extended presence of the second signal for block 606. Current shunt control circuitry 450 for one embodiment may identify that a terminated line has an extended presence of the second signal if the second signal is present on the terminated line for more than any suitable predetermined number of one or more data cycles defined by the clock signal generated and output from clock source 460. The predetermined number of data cycle(s) for a given terminated line for a given iteration of block 608 may or may not be the same as that for another terminated line for the same iteration of block 608. The predetermined number of data cycle(s) for a given terminated line for a given iteration of block 608 may or may not be the same as that for the same terminated line for another iteration of block 608.

Current shunt control circuitry 450 for one embodiment for block 608 may disable enabled current shunt circuitry 431, 432, 433, and/or 434, if any, for a number of one or more of terminated lines 121, 122, 123, and 124, respectively, having an extended presence of a second signal in response to one or more of terminated lines 121, 122, 123, and 124 having an extended presence of the second signal for block 606.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal in response to all of terminated lines 121, 122, 123, and 124 having the second signal for block 606.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal in response to all of terminated lines 121, 122, 123, and 124 having an extended presence of the second signal for block 606.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal based on the number of current shunt circuitry 431, 432, 433, and 434, respectively, that are already disabled.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal based on which of current shunt circuitry 431, 432, 433, and 434 are already disabled.

Current shunt control circuitry 450 for one embodiment for block 608 may disable enabled current shunt circuitry 431, 432, 433, and/or 434, if any, for a number of one or more of terminated lines 121, 122, 123, and 124, respectively, having a second signal in response to the satisfaction of any suitable one or more conditions based on a presence of a second signal on one or more of terminated lines 121, 122, 123, and 124 and based on when one or more of current shunt circuitry 431, 432, 433, and 434, if any, have already been disabled. In this manner, current shunt control circuitry 450 for one embodiment may skip one or more iterations of block 608 to help control the rate at which current shunt control circuitry 450 helps reduce the amount of shunted current.

Current shunt control circuitry 450 for one embodiment may selectively enable or disable one or more of current shunt circuitry 431, 432, 433, and 434 in one or more predetermined sets of one or more of current shunt circuitry 431, 432, 433, and 434 in accordance with flow diagram 600 of FIG. 6.

Current shunt control circuitry 450 for one embodiment for block 604 may enable one or more of current shunt circuitry 431, 432, 433, and/or 434 in a set in response to a first signal on one or more of terminated lines 121, 122, 123, and/or 124 for the set. Current shunt control circuitry 450 for one embodiment may enable the current shunt circuitry 431, 432, 433, and/or 434 in a set for the respective terminated line 121, 122, 123, and/or 124 having a first signal for the set. Current shunt control circuitry 450 for one embodiment may enable all of current shunt circuitry 431, 432, 433, and/or 434 in a set in response to a first signal on one or more of terminated lines 121, 122, 123, and/or 124 for the set. Current shunt control circuitry 450 for one embodiment may enable current shunt circuitry 431, 432, 433, and/or 434 in a set based on the number of current shunt circuitry 431, 432, 433, and/or 434 that are already enabled for the set. Current shunt control circuitry 450 for one embodiment may enable current shunt circuitry 431, 432, 433, and/or 434 in a set based on which of current shunt circuitry 431, 432, 433, and/or 434 are already enabled for the set.

Current shunt control circuitry 450 for one embodiment for block 608 may disable enabled current shunt circuitry 431, 432, 433, and/or 434, if any, for at most any suitable predetermined number of any suitable one or more of terminated lines 121, 122, 123, and/or 124, respectively, having a second signal for a set. As one example, current shunt control circuitry 450 for one embodiment may, for each of multiple iterations of block 608, disable enabled current shunt circuitry 431, 432, 433, and/or 434 for at most a predetermined number of terminated lines 121, 122, 123, and/or 124, respectively, in a set less than, or alternatively less than or equal to, the total number of terminated lines 121, 122, 123, and/or 124 in that set. As another example, current shunt control circuitry 450 for one embodiment may disable enabled current shunt circuitry 431, 432, 433, or 434 for at most one terminated line 121, 122, 123, or 124, respectively, in a set for each of multiple iterations of block 608. The predetermined number of terminated line(s) for a set for a given iteration of block 608 may or may not be the same as that for another set for the same iteration of block 608. The predetermined number of terminated line(s) for a set for a given iteration of block 608 may or may not be the same as that for the same set for another iteration of block 608.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set in response to one or more of terminated lines 121, 122, 123, and/or 124 for the set having the second signal for block 606.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set in response to one or more of terminated lines 121, 122, 123, and/or 124 for the set having an extended presence of the second signal for block 606. Current shunt control circuitry 450 for one embodiment may identify that a terminated line has an extended presence of the second signal if the second signal is present on the terminated line for more than any suitable predetermined number of one or more data cycles defined by the clock signal generated and output from clock source 460. The predetermined number of data cycle(s) for a given terminated line for a given iteration of block 608 may or may not be the same as that for another terminated line for the same iteration of block 608. The predetermined number of data cycle(s) for a given terminated line for a given iteration of block 608 may or may not be the same as that for the same terminated line for another iteration of block 608.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having an extended presence of a second signal for a set in response to one or more of terminated lines 121, 122, 123, and/or 124 for the set having an extended presence of the second signal for block 606.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set in response to all of terminated lines 121, 122, 123, and/or 124 for the set having the second signal for block 606.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set in response to all of terminated lines 121, 122, 123, and/or 124 for the set having an extended presence of the second signal for block 606.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set based on the number of current shunt circuitry 431, 432, 433, and/or 434 that are already disabled for the set.

Current shunt control circuitry 450 for one embodiment for block 608 may disable enabled current shunt circuitry 431, 432, 433, and/or 434, if any, for a number of one or more of terminated lines 121, 122, 123, and/or 124, respectively, having a second signal for a set based on which of current shunt circuitry 431, 432, 433, and/or 434 of the set are already disabled.

In performing operations for an iteration of blocks 602, 604, 606, and/or 608, current shunt control circuitry 450 for one embodiment may maintain in a disabled state disabled current shunt circuitry 431, 432, 433, and/or 434 for one or more of terminated lines 121, 122, 123, and/or 124, respectively, having a second signal. For one embodiment where current shunt control circuitry 450 may enable for block 604 disabled current shunt circuitry 431, 432, 433, and/or 434 for one or more of terminated lines 121, 122, 123, and/or 124, respectively, having a second signal in response to a first signal on another terminated line 121, 122, 123, and/or 124, current shunt control circuitry 450 for one embodiment may maintain in a disabled state one or more other disabled current shunt circuitry 431, 432, 433, and/or 434, if any, for one or more of terminated lines 121, 122, 123, and/or 124, respectively, having a second signal. Current shunt control circuitry 450 for one embodiment may maintain in an enabled state enabled current shunt circuitry 431, 432, 433, and/or 434, if any, that is for one or more of terminated lines 121, 122, 123, and/or 124, respectively, having a second signal and that is not disabled for block 608.

Current shunt control circuitry 450 may perform operations for blocks 602–608 in any suitable order and may or may not overlap in time the performance of any suitable operation with any other suitable operation.

Example Current Shunt Control Circuitry

Figure 7:
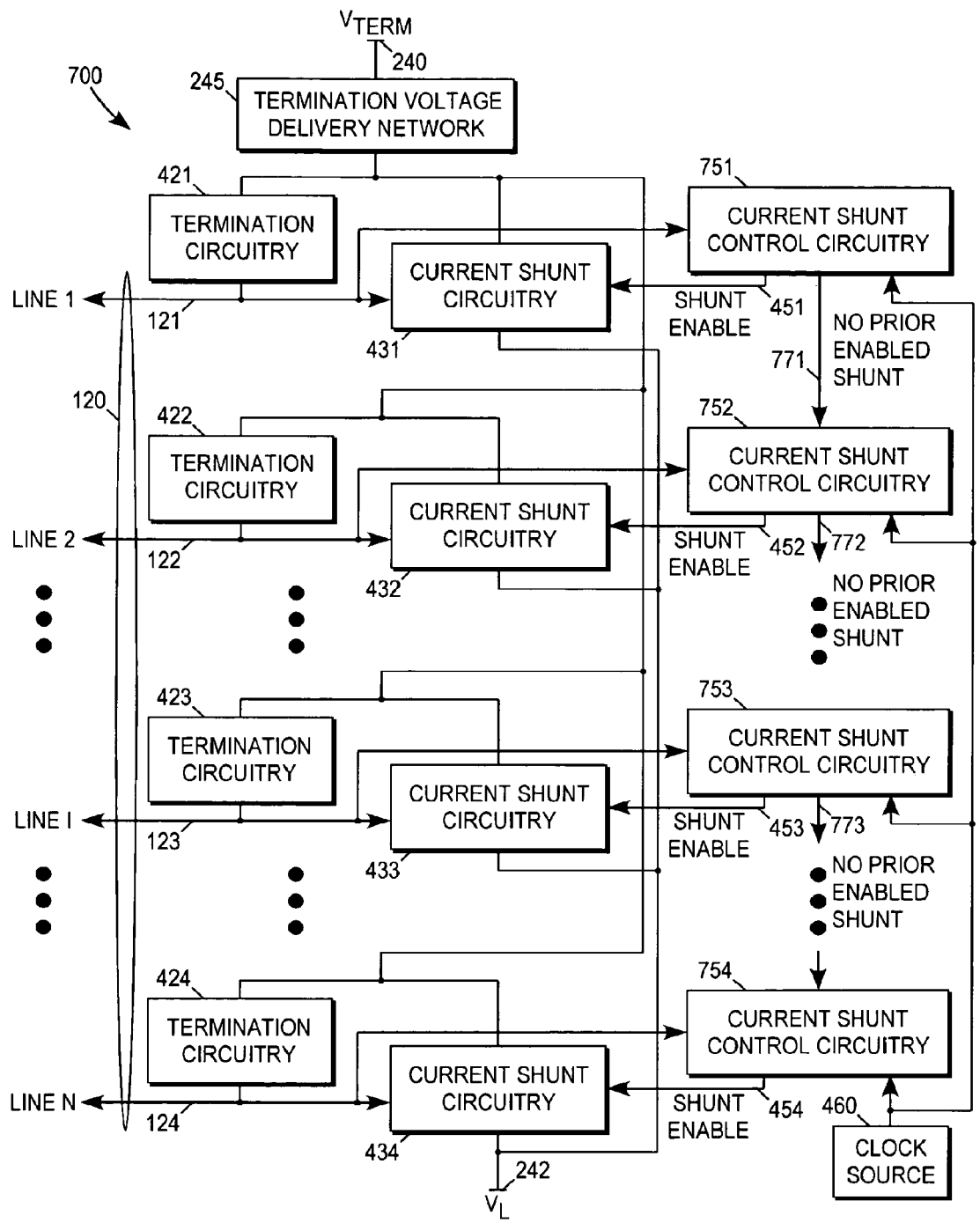
FIG. 7 illustrates, for one or more embodiments, a block diagram of circuitry to implement termination voltage current shunting with shunted current reduction for extended shunting.

FIG. 7 illustrates, for one or more embodiments, a block diagram of circuitry 700 comprising current shunt control circuitry 751, 752, 753, and 754 to implement one or more embodiments of current shunt control circuitry 450 of FIG. 4.

Current shunt control circuitry 751, 752, 753, and 754 are coupled to enable or disable current shunt circuitry 431, 432, 433, and 434, respectively, in a selective manner to help reduce current variation through termination voltage delivery network 245 and to help reduce the amount of shunted current for extended current shunting to help reduce power consumption. Current shunt control circuitry 751, 752, 753, and 754 for one embodiment, as illustrated in FIG. 7, may be coupled to generate and output an enable signal on shunt enable line 451, 452, 453, and 454, respectively, to enable current shunt circuitry 431, 432, 433, and 434, respectively. Current shunt control circuitry 751, 752, 753, and 754 for one embodiment, as illustrated in FIG. 7, may be coupled to generate and output a disable signal on shunt enable line 451, 452, 453, and 454, respectively, to disable current shunt circuitry 431, 432, 433, and 434, respectively.

Current shunt control circuitry 751, 752, 753, and 754 for one embodiment may be coupled to enable current shunt circuitry 431, 432, 433, and 434, respectively, if terminated line 121, 122, 123, and 124, respectively, has a first signal.

Current shunt control circuitry 751, 752, 753, and 754 for one embodiment may be logically ordered in any suitable predetermined manner relative to one another to help enable current shunt circuitry 431, 432, 433, and/or 434 based on which of current shunt circuitry 431, 432, 433, and/or 434 are already enabled. Current shunt control circuitry 751, 752, 753, and 754 for one embodiment may be coupled to enable current shunt circuitry 431, 432, 433, and 434, respectively, if terminated line 121, 122, 123, and 124, respectively, has a first signal. Current shunt control circuitry 751, 752, 753, and 754 for one embodiment may be coupled to enable current shunt circuitry 431, 432, 433, and 434, respectively, if terminated line 121, 122, 123, and 124, respectively, has a first signal and/or if any prior current shunt control circuitry 751, 752, 753, and/or 754 in the order has enabled current shunt circuitry 431, 432, 433, and/or 434, respectively.

Current shunt control circuitry 751, 752, 753, and 754 for one embodiment may be coupled to disable current shunt circuitry 431, 432, 433, and 434, respectively, if terminated line 121, 122, 123, and 124, respectively, has an extended presence of a second signal.

Current shunt control circuitry 751, 752, 753, and 754 for one embodiment may be logically ordered in any suitable predetermined manner relative to one another to help disable current shunt circuitry 431, 432, 433, and/or 434 based on which of current shunt circuitry 431, 432, 433, and/or 434 are already disabled. Current shunt control circuitry 751, 752, 753, and 754 for one embodiment may be coupled to disable current shunt circuitry 431, 432, 433, and 434, respectively, if terminated line 121, 122, 123, and 124, respectively, has a second signal and if all prior current shunt control circuitry 751, 752, 753, and/or 754, if any, in the order has disabled current shunt circuitry 431, 432, 433, and/or 434, respectively.

Current shunt control circuitry 751, 752, 753, and 754 for one embodiment may be coupled to one another in a daisy chain to define an order for current shunt control circuitry 751, 752, 753, and 754.

For one embodiment, current shunt control circuitry 751 may be ordered prior to current shunt control circuitry 752, current shunt control circuitry 752 may be ordered prior to current shunt control circuitry 753, and current shunt control circuitry 753 may be ordered prior to current shunt control circuitry 754.

Current shunt control circuitry 751 for one embodiment may identify to current shunt control circuitry 752 whether current shunt control circuitry 751 has enabled or disabled current shunt circuitry 431. Current shunt control circuitry 751 for one embodiment, as illustrated in FIG. 7, may be coupled to generate and output a prior enabled shunt signal or a no prior enabled shunt signal to current shunt control circuitry 752 on a no prior enabled shunt line 771 to identify to current shunt control circuitry 752 that current shunt control circuitry 751 has enabled or disabled, respectively, current shunt circuitry 431.

Current shunt control circuitry 752 for one embodiment may identify to current shunt control circuitry 753 whether any one of current shunt control circuitry 751 and 752 has enabled current shunt circuitry 431 and 432, respectively, or whether both current shunt control circuitry 751 and 752 have disabled current shunt circuitry 431 and 432, respectively. Current shunt control circuitry 752 for one embodiment, as illustrated in FIG. 7, may be coupled to generate and output a prior enabled shunt signal to current shunt control circuitry 753 on a no prior enabled shunt line 772 to identify to current shunt control circuitry 753 that at least one of current shunt control circuitry 751 and 752 has enabled current shunt circuitry 431 and 432, respectively, or generate and output a no prior enabled shunt signal to current shunt control circuitry 753 on no prior enabled shunt line 772 to identify to current shunt control circuitry 753 that both current shunt control circuitry 751 and 752 have disabled current shunt circuitry 431 and 432, respectively.

Current shunt control circuitry 753 for one embodiment may identify to current shunt control circuitry 754 whether any one of current shunt control circuitry 751, 752, and 753 has enabled current shunt circuitry 431, 432, and 433, respectively, or whether all of current shunt control circuitry 751, 752, and 753 have disabled current shunt circuitry 431, 432, and 433, respectively. Current shunt control circuitry 753 for one embodiment, as illustrated in FIG. 7, may be coupled to generate and output a prior enabled shunt signal to current shunt control circuitry 754 on a no prior enabled shunt line 773 to identify to current shunt control circuitry 754 that at least one of current shunt control circuitry 751, 752, and 753 has enabled current shunt circuitry 431, 432, and 433, respectively, or generate and output a no prior enabled shunt signal to current shunt control circuitry 754 on no prior enabled shunt line 773 to identify to current shunt control circuitry 754 that all of current shunt control circuitry 751, 752, and 753 have disabled current shunt circuitry 431, 432, and 433, respectively.

Current shunt control circuitry 751, 752, 753, and 754 for one embodiment may be coupled to receive a signal on terminated line 121, 122, 123, and 124, respectively, and may enable current shunt circuitry 431, 432, 433, and 434, respectively, in response to the first signal on terminated line 121, 122, 123, and 124, respectively.

Current shunt control circuitry 752 for one embodiment may enable current shunt circuitry 432 in response to current shunt control circuitry 751 enabling current shunt circuitry 431. Current shunt control circuitry 753 for one embodiment may enable current shunt circuitry 433 in response to current shunt control circuitry 752 enabling current shunt circuitry 432 and/or current shunt control circuitry 751 enabling current shunt circuitry 431. Current shunt control circuitry 754 for one embodiment may enable current shunt circuitry 434 in response to current shunt control circuitry 753 enabling current shunt circuitry 433, current shunt control circuitry 752 enabling current shunt circuitry 432, and/or current shunt control circuitry 751 enabling current shunt circuitry 431.

Current shunt control circuitry 751 for one embodiment may disable current shunt circuitry 431 in response to the second signal on terminated line 121. Current shunt control circuitry 752 for one embodiment may disable current shunt circuitry 432 in response to both the second signal on terminated line 122 and current shunt control circuitry 751 disabling current shunt circuitry 431. Current shunt control circuitry 753 for one embodiment may disable current shunt circuitry 433 in response to the second signal on terminated line 123 and both current shunt control circuitry 751 and 752 disabling current shunt circuitry 431 and 432, respectively. Current shunt control circuitry 754 for one embodiment may disable current shunt circuitry 434 in response to the second signal on terminated line 124 and all of current shunt control circuitry 751, 752, and 753 disabling current shunt circuitry 431, 432, and 433, respectively.

Current shunt control circuitry 751, 752, 753, and 754 for one embodiment may be grouped in a plurality of sets for one or more of terminated lines 121, 122, 123, and 124. In this manner, current shunt control circuitry 751, 752, 753, and/or 754 in a set for more than one of terminated lines 121, 122, 123, and 124 may be logically ordered for one embodiment in any suitable predetermined manner relative to one another. As one example, current shunt control circuitry 751 may be ordered prior to current shunt control circuitry 752 for one set, and current shunt control circuitry 753 may be ordered prior to current shunt control circuitry 754 for another set.

Current shunt control circuitry 751, 752, 753, and 754 may comprise any suitable circuitry to enable or disable current shunt circuitry 431, 432, 433, and 434, respectively, in a selective manner.

Figure 8:
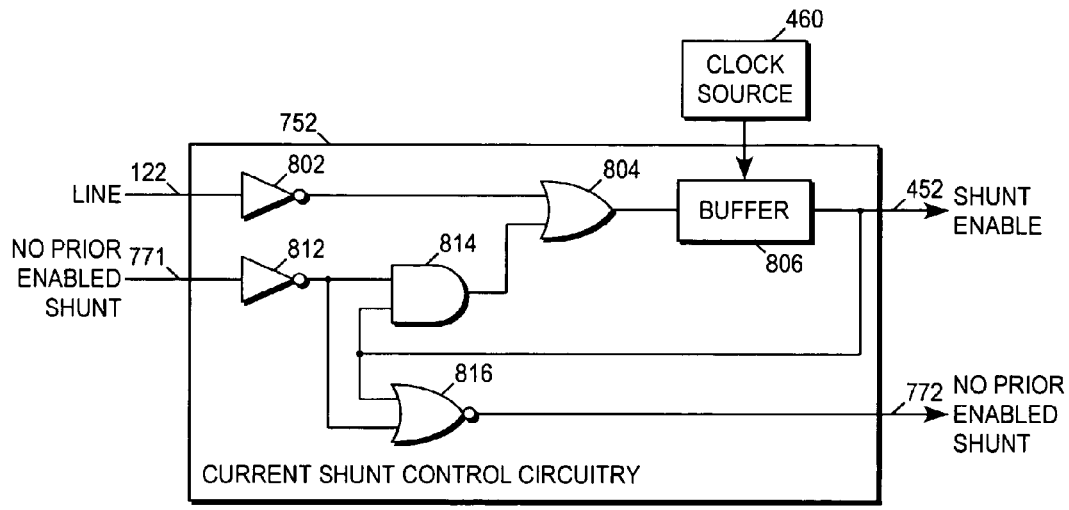
FIG. 8 illustrates, for one or more embodiments, a functional diagram of current shunt control circuitry of FIG. 7.

For one embodiment, current shunt control circuitry 752, for example, may comprise any suitable circuitry to implement an inverter 802, an OR gate 804, a buffer 806, an inverter 812, an AND gate 814, and a NOR gate 816 as illustrated in FIG. 8.

Inverter 802 is coupled to receive and invert a signal on terminated line 122 to generate and output a shunt enable signal through OR gate 804 to buffer 806 in response to a first signal on terminated line 122. Buffer 806 is coupled to receive the clock signal from clock source 460 and to receive and store the shunt enable signal from OR gate 804 and output the shunt enable signal on shunt enable line 452 in response to the clock signal. Current shunt control circuitry 752 of FIG. 8 therefore enables current shunt circuitry 432 in response to a first signal on terminated line 122.

Inverter 812 is coupled to receive and invert a signal on no prior enabled shunt line 771. AND gate 814 is coupled to receive the inverted signal from inverter 812 and a signal on shunt enable line 452 to generate and output a shunt enable signal through OR gate 804 to buffer 806 in response to both a prior enabled shunt signal on no prior enabled shunt line 771 and a shunt enable signal on shunt enable line 452. Current shunt control circuitry 752 of FIG. 8 therefore continues to enable current shunt circuitry 432 in response to the enabling of current shunt circuitry by any prior current shunt control circuitry, that is the enabling of current shunt circuitry 431 by current shunt control circuitry 751, regardless of the signal on terminated line 122.

OR gate 804 generates and outputs a shunt disable signal to buffer 806 in response to a second signal on terminated line 122 and either a no prior enabled shunt signal on no prior enabled shunt line 771 or a shunt disable signal on shunt enable line 452. Buffer 806 receives and stores the shunt disable signal and outputs the shunt disable signal on shunt enable line 452 in response to the clock signal. Current shunt control circuitry 752 of FIG. 8 therefore disables current shunt circuitry 432 in response to a second signal on terminated line 122 and the disabling of current shunt circuitry by all prior current shunt control circuitry, that is the disabling of current shunt circuitry 431 by current shunt control circuitry 751, and then continues to disable current shunt circuitry 432 in response to a second signal on terminated line 122 regardless of whether current shunt circuitry is enabled or disabled by any prior current shunt control circuitry.

NOR gate 816 is coupled to receive the inverted signal from inverter 812 and a signal on shunt enable line 452 to generate and output a prior enabled shunt signal on no prior enabled shunt line 772 in response to either a shunt enable signal on shunt enable line 452 or a prior enabled shunt signal on no prior enabled shunt line 771. Current shunt control circuitry 752 of FIG. 8 therefore identifies to current shunt control circuitry 753 that current shunt control circuitry prior to current shunt control circuitry 753, that is either current shunt control circuitry 751 or current shunt control circuitry 752, has enabled current shunt circuitry.

NOR gate 816 also generates and outputs a no prior enabled shunt signal on no prior enabled shunt line 772 in response to both a shunt disable signal on shunt enable line 452 and a no prior enabled shunt signal on no prior enabled shunt line 771. Current shunt control circuitry 752 of FIG. 8 therefore identifies to current shunt control circuitry 753 that all current shunt control circuitry prior to current shunt control circuitry 753, that is both current shunt control circuitry 751 and current shunt control circuitry 752, has disabled current shunt circuitry.

Current shunt control circuitry 751, 753, and/or 754 for one embodiment may comprise similar circuitry as that for current shunt control circuitry 752.

For one embodiment where current shunt control circuitry 751, for example, does not have any prior current shunt control circuitry, the no prior enabled shunt line input to current shunt control circuitry 751 for one embodiment may be coupled to a suitable voltage supply to generate a no prior enabled shunt signal on that line. Current shunt control circuitry 751 may then disable current shunt circuitry 431 in response to a second signal on terminated line 121. Current shunt control circuitry 751 for another embodiment may not comprise OR gate 804, inverter 812, AND gate 814, or NOR gate 816 and may comprise an inverter to invert the signal on shunt enable line 451 for output on no prior enabled shunt line 771.

For one embodiment where current shunt control circuitry 754, for example, is not prior to any current shunt control circuitry, any signal output from current shunt control circuitry 754 on its no prior enabled shunt line may be ignored. Current shunt control circuitry 754 for another embodiment may not comprise NOR gate 816.

Current shunt control circuitry 751, 752, 753, and/or 754 for one embodiment may comprise any suitable circuitry to allow current shunt control circuitry 751, 752, 753, and/or 754, respectively, to be enabled and disabled.

Figure 9:
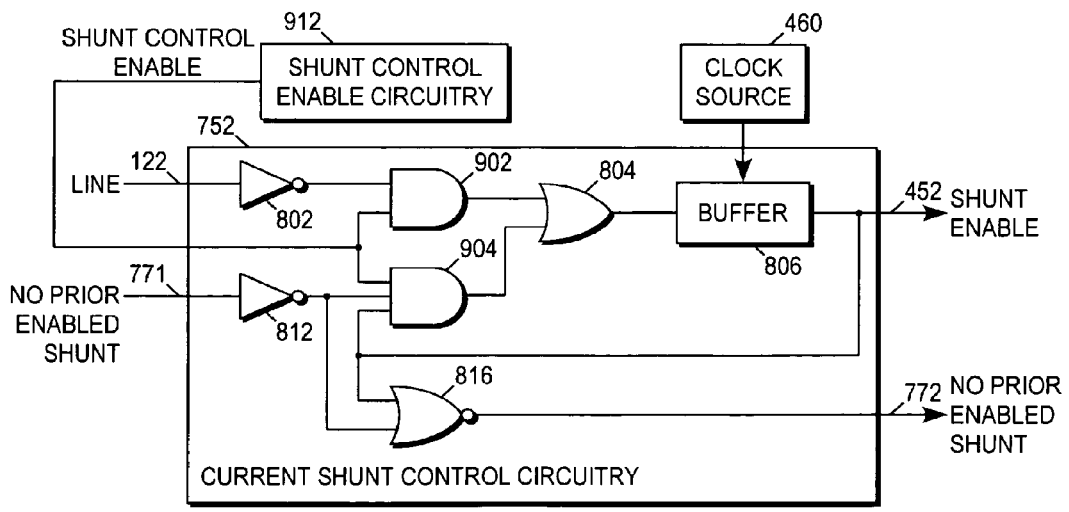
FIG. 9 illustrates, for one or more other embodiments, a functional diagram of current shunt control circuitry of FIG. 7.

For one embodiment, current shunt control circuitry 752, for example, may comprise any suitable circuitry to implement AND gates 902 and 904 in addition to inverter 802, OR gate 804, buffer 806, inverter 812, and NOR gate 816 as illustrated in FIG. 9.

AND gate 902 is coupled to receive the inverted signal from inverter 802 and a signal from shunt control enable circuitry 912 to generate and output a shunt enable signal through OR gate 804 to buffer 806 in response to a first signal on terminated line 122 and an enable signal from shunt control enable circuitry 912.

AND gate 904 is coupled to receive the inverted signal from inverter 812, a signal on shunt enable line 452, and a signal from shunt control enable circuitry 912 to generate and output a shunt enable signal through OR gate 804 to buffer 806 in response to a prior enabled shunt signal on no prior enabled shunt line 771, a shunt enable signal on shunt enable line 452, and an enable signal from shunt control enable circuitry 912.

AND gates 902 and 904 both prevent generation of a shunt enable signal in response to a disable signal from shunt control enable circuitry 912.

Shunt control enable circuitry 912 may comprise any suitable circuitry to enable or disable current shunt control circuitry 751, 752, 753, and/or 754 in any suitable manner. Shunt control enable circuitry 912 for one embodiment may comprise suitable circuitry to generate and output an enable signal on one or more shunt control enable lines coupled to current shunt control circuitry 751, 752, 753, and 754 in response to a signal identifying device 110 as a terminating device. Such a signal may be generated, for example, by coupling an input/output (I/O) line of device 110 to a suitable voltage supply to identify that device 110 is in a terminating position relative to bus 120.

Although described as part of device 110, shunt control enable circuitry 912 for another embodiment may be external to device 110 and may comprise any suitable circuitry to generate and output an enable or disable signal on one or more enable lines input to device 110. For one embodiment, a shunt control enable line may be coupled to a suitable voltage supply external to device 110.

Example Signal Timing Diagrams

Figure 10:
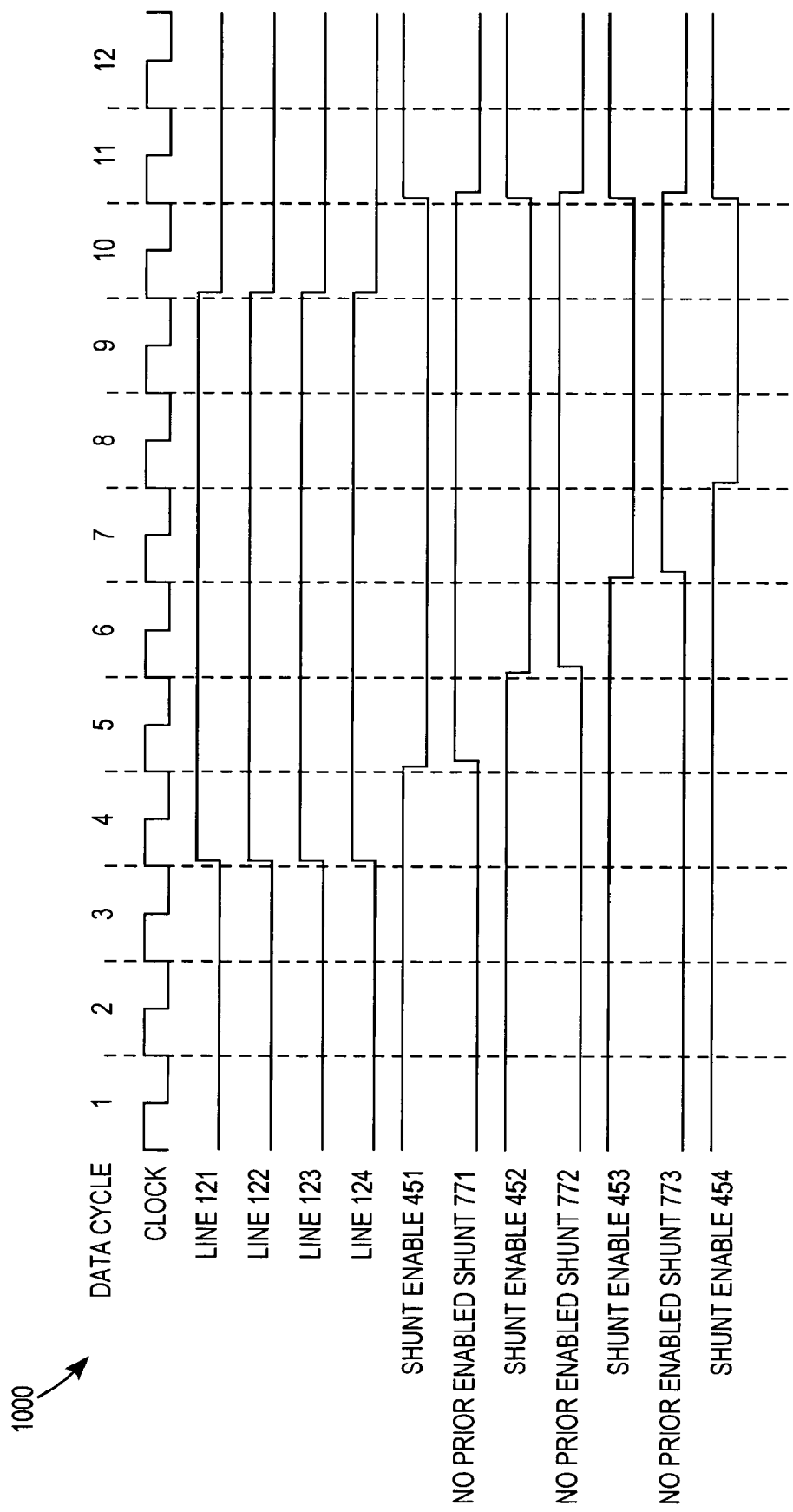
FIG. 10 illustrates, for one or more embodiments, an example signal timing diagram for current shunt control circuitry for a plurality of lines.

FIG. 10 illustrates one example signal timing diagram 1000 for one embodiment where current shunt circuitry 230 comprises the circuitry of FIGS. 7 and 8 for four terminated lines 121, 122, 123, and 124. As illustrated in the example of FIG. 10, current shunt control circuitry 751, 752, 753, and 754 initially generate enable signals on shunt enable lines 451, 452, 453, and 454, respectively. All four terminated lines 121, 122, 123, and 124 initially have first signals that switch to second signals for the fourth through the ninth data cycles.

In response to the second signal on terminated line 121 for the fourth data cycle, current shunt control circuitry 751 generates a disable signal on shunt enable line 451 and a no prior enabled shunt signal on no prior enabled shunt line 771 for the fifth data cycle. In response to the second signal on terminated line 122 and the no prior enabled shunt signal on no prior enabled shunt line 771 for the fifth data cycle, current shunt control circuitry 752 generates a disable signal on shunt enable line 452 and a no prior enabled shunt signal on no prior enabled shunt line 772 for the sixth data cycle. In response to the second signal on terminated line 123 and the no prior enabled shunt signal on no prior enabled shunt line 772 for the sixth data cycle, current shunt control circuitry 753 generates a disable signal on shunt enable line 453 and a no prior enabled shunt signal on no prior enabled shunt line 773 for the seventh data cycle. In response to the second signal on terminated line 124 and the no prior enabled shunt signal on no prior enabled shunt line 773, current shunt control circuitry 754 generates a disable signal on shunt enable line 454 for the eighth data cycle.

By disabling current shunt circuitry 431, 432, 433, or 434 for at most one terminated line 121, 122, 123, or 124, respectively, per data cycle, current shunt control circuitry 751, 752, 753, and 754, respectively, for one embodiment may therefore help gradually reduce the amount of current shunted through termination voltage delivery network 245 by current shunt circuitry 431, 432, 433, and 434, respectively, for extended shunting.

Figure 11:
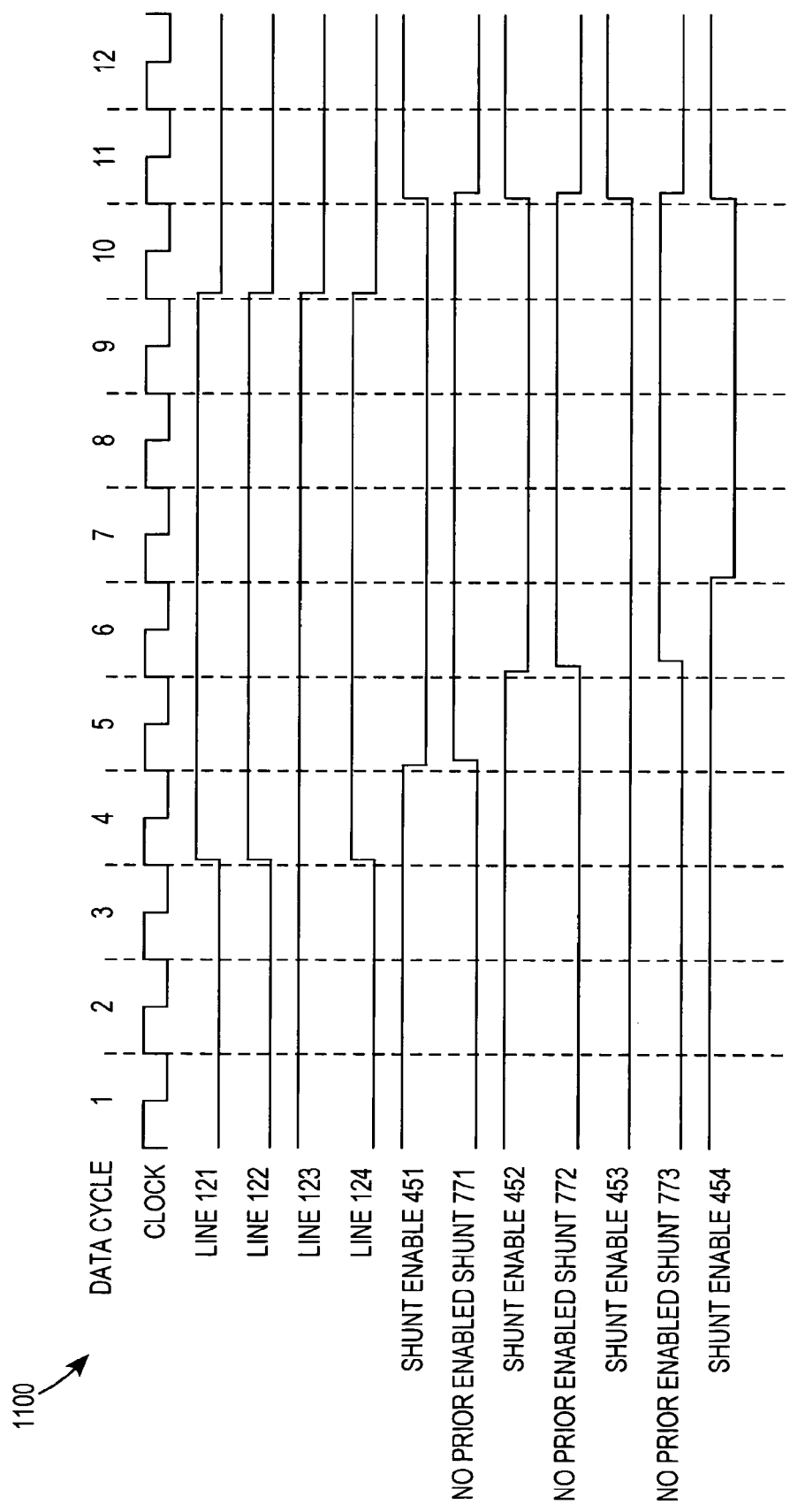
FIG. 11 illustrates, for one or more embodiments, another example signal timing diagram for current shunt control circuitry for a plurality of lines.

FIG. 11 illustrates another example signal timing diagram 1100 for one embodiment where current shunt circuitry 230 comprises the circuitry of FIGS. 7 and 8 for four terminated lines 121, 122, 123, and 124. As illustrated in the example of FIG. 11, current shunt control circuitry 751, 752, and 754 initially generate enable signals on shunt enable lines 451, 452, and 454, respectively, and current shunt control circuitry 753 initially generates a disable signal on shunt enable line 453. Terminated lines 121, 122, and 124 initially have first signals that switch to second signals for the fourth through the ninth data cycles. Terminated line 123 initially has a second signal through the ninth data cycle.

In response to the second signal on terminated line 121 for the fourth data cycle, current shunt control circuitry 751 generates a disable signal on shunt enable line 451 and a no prior enabled shunt signal on no prior enabled shunt line 771 for the fifth data cycle. In response to the second signal on terminated line 122 and the no prior enabled shunt signal on no prior enabled shunt line 771 for the fifth data cycle, current shunt control circuitry 752 generates a disable signal on shunt enable line 452 and a no prior enabled shunt signal on no prior enabled shunt line 772 for the sixth data cycle. Because current shunt control circuitry 753 is already generating a disable signal on shunt enable line 453 for the sixth data cycle, current shunt control circuitry 753 also generates a no prior enabled shunt signal on no prior enabled shunt line 773 for the sixth data cycle in response to the no prior enabled shunt signal on no prior enabled shunt line 772. In response to the second signal on terminated line 124 and the no prior enabled shunt signal on no prior enabled shunt line 773 for the sixth data cycle, current shunt control circuitry 754 generates a disable signal on shunt enable line 454 for the seventh data cycle.

Current shunt control circuitry 751, 752, 753, and 754 for one embodiment may therefore disable current shunt circuitry 431, 432, 433, or 434, respectively, for at most one terminated line 121, 122, 123, or 124, respectively, per data cycle despite any one or more of current shunt circuitry 431, 432, 433, and 434 already being disabled.

In the foregoing description, one or more embodiments of the present invention have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
    drawing current from a termination voltage supply and through a termination voltage delivery network by termination circuitry in response to a first signal on one or more lines terminated by the termination circuitry;
    shunting an amount of current from the termination voltage supply and through the termination voltage delivery network in response to a second signal on one or more terminated lines; and
    reducing the amount of shunted current for extended current shunting.

2. The method of claim 1, wherein the reducing the amount of shunted current is performed gradually.

3. The method of claim 1, wherein the reducing the amount of shunted current is performed in response to satisfaction of conditions based on the presence of the second signal on the one or more terminated lines.

4. The method of claim 1, wherein the reducing the amount of shunted current is performed in response to an extended presence of a second signal on one or more terminated lines.

5. The method of claim 1, wherein the reducing the amount of shunted current comprises disabling current shunting for one or more terminated lines.

6. The method of claim 1, wherein the reducing the amount of shunted current comprises disabling current shunting for at most a predetermined number of one or more terminated lines for at least one data cycle.

7. The method of claim 1, comprising enabling current shunting for one or more terminated lines in response to the first signal on one or more terminated lines.

8. An apparatus comprising:
    termination circuitry to terminate one or more lines, the termination circuitry to draw current from a termination voltage supply and through a termination voltage delivery network; and
    current shunt circuitry to draw current from the termination voltage supply and through the termination voltage delivery network as shunted current, wherein the current shunt circuitry reduces any shunted current for extended current shunting.

9. The apparatus of claim 8, wherein the current shunt circuitry reduces the shunted current gradually.

10. The apparatus of claim 8, wherein the current shunt circuitry reduces the shunted current based on whether one or more conditions with respect to a presence of a signal on one or more terminated lines have been satisfied.

11. The apparatus of claim 8, wherein the current shunt circuitry reduces the shunted current based on an extended presence of a signal on one or more terminated lines.

12. The apparatus of claim 8, wherein the current shunt circuitry comprises current shunt control circuitry to disable current shunt circuitry for one or more terminated lines to reduce the shunted current.

13. The apparatus of claim 8, wherein the current shunt circuitry comprises current shunt control circuitry that disables the current shunt circuitry for at least one data cycle for at most a predetermined number of one or more terminated lines to reduce the shunted current.

14. The apparatus of claim 8, wherein the current shunt circuitry comprises current shunt control circuitry to enable current shunt circuitry for one or more terminated lines in response to a signal on one or more terminated lines.

15. An apparatus comprising:
    means for terminating one or more lines;
    means for shunting current from a termination voltage supply and through a termination voltage delivery network; and
    means for reducing the shunted current for extended shunting.

16. The apparatus of claim 15, wherein the means for reducing the shunted current comprises means for disabling current shunt circuitry for one or more terminated lines.

17. The apparatus of claim 15, comprising means for enabling current shunt circuitry for one or more terminated lines in response to a signal on one or more terminated lines.

18. A system comprising:
    a bus comprising one or more lines;
    a termination voltage supply; and
    a plurality of devices coupled to the bus, wherein at least one device is a terminating device comprising a termination voltage delivery network and termination circuitry coupled to the termination voltage supply to terminate one or more lines of the bus, the terminating device having termination voltage current shunting that reduces the shunted current for extended shunting.

19. The system of claim 18, wherein the terminating device comprises circuitry to reduce shunted current gradually.

20. The system of claim 18, wherein the terminating device comprises circuitry to help reduce shunted current based on whether one or more conditions based on a presence of a signal on one or more terminated lines have been satisfied.

21. The system of claim 18, wherein the terminating device comprises circuitry to reduce shunted current based on an extended presence of a signal on one or more terminated lines.

22. The system of claim 18, wherein the terminating device comprises circuitry to disable current shunt circuitry for one or more terminated lines to reduce shunted current.

23. The system of claim 18, wherein the terminating device comprises circuitry to disable current shunt circuitry for at least one data cycle for at most a predetermined number of one or more terminated lines to reduce shunted current.

24. The system of claim 18, wherein the terminating device comprises circuitry to enable current shunt circuitry for one or more terminated lines in response to a signal on one or more terminated lines.

* * * * *